Jan. 30, 1962 B. R. RAWDING Re. 25,119

SUPPORTS FOR VIBRATORY DEVICES

Original Filed Oct. 4, 1956

INVENTOR
BURTON R. RAWDING
BY Elmer J. Gorn
ATTORNEY

United States Patent Office

Re. 25,119
Reissued Jan. 30, 1962

25,119

SUPPORTS FOR VIBRATORY DEVICES

Burton R. Rawding, Walpole, Mass., assignor to Raytheon Company, a corporation of Delaware Original No. 2,866,911, dated Dec. 30, 1958, Ser. No. 614,007, Oct. 4, 1956. Application for reissue Aug. 11, 1960, Ser. No. 49,113
11 Claims. (Cl. 310—26)

Figure 1:
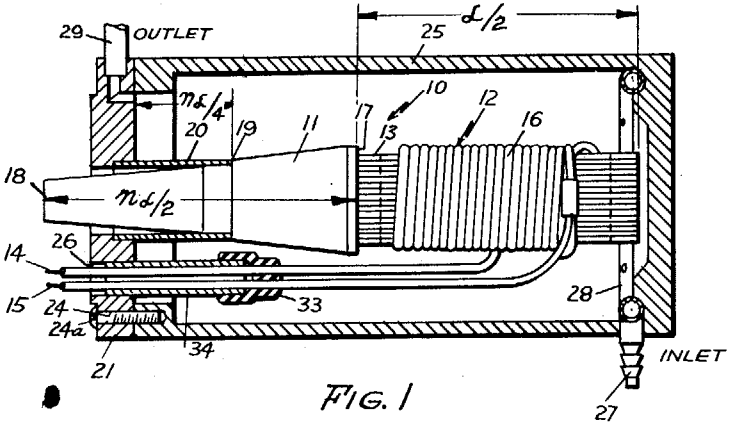

Matter enclosed in heavy brackets [ ] appears in the original patent but forms no part of this reissue specification; matter printed in italics indicates the additions made by reissue.

This invention relates to magnetostrictive vibrator systems and, in particular, to support means for rigidly supporting a vibratory system in order to perform work.

The present invention is an improvement of a vibratory system characteristically similar to that disclosed in [a] United States Patent 2,632,858 to Carlo L. Calosi. As disclosed in the patent to Calosi, supporting the *longitudinally*-vibrating element of vibratory devices at a node of the [vibratory element] *longitudinal vibration* results in unsatisfactory operation of the device. In accordance with the present invention, a vibratory device is supported rigidly at *longitudinal* node of the vibrating element in a manner which results in not only satisfactory operation of the device without the inherent defects referred to in the aforementioned patent, but which is less complex and yet free of lateral movement. Accordingly, a rigid cylindrical sleeve is attached to the vibrating element, or transmitting cone, of the device substantially at a node of the longitudinal vibrations induced therein. The length of the sleeve is preferably selected to be substantially an odd integral number of [quarter wavelengths of the vibratory frequency,] *quarters of the wavelength of propagation of radial vibrations along the length of the sleeve,* and *one end of such* [said] sleeve is attached to [said] *the* vibrating element at substantially a longitudinal *vibration* node. The sleeve extends toward the [tapered] *smaller* end of the tapered vibrating element and is terminated by a ring having a large mass. Mounted on the ring is a housing for enveloping the vibratory system, and contained in said housing is the cooling system for the device.

The sleeve and the structures attached thereto are substantially free of longitudinal vibrations because of the attachment of the sleeve to the vibrating element at a longitudinal node. Radial vibrations *of the vibrating element* at the *longitudinal* node induce [transverse waves] *corresponding radial vibrations* in the sleeve, and, ostensibly, it would be expected that the sleeve would be subjected to stresses, and the device subjected to loss of energy and lateral movement. The present invention is not subject to the ostensible defects described. One seemingly plausible explanation of the invention is that radial waves in the sleeve travel [transversely] the length of the sleeve, only to be reflected back by the large mass of the ring attached thereto. Due to this phenomenon, standing waves exist in the sleeve so that, initially, it can be said that the ring and the structure attached thereto do not take energy out of the vibrating system. In addition, since the length of the sleeve is preferably adjusted to a quarter *of the wavelength of propagation of radial vibrations along the length of the sleeve,* [wavelength] and a phase reversal occurs at said large mass, reflected waves arrive back at the originating point in phase so that the sleeve is free of stresses, particularly at the junction of the sleeve and the vibratory element, which would ordinarily occur if an out-of-phase condition existed.

Figure 2:
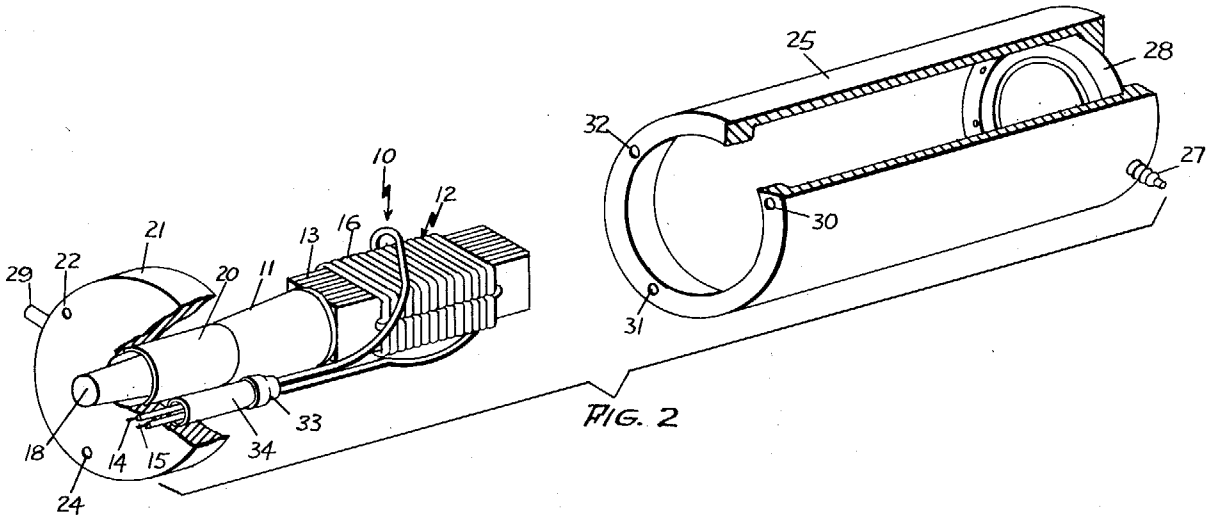

Other and further advantages of the invention will become apparent from the description of a particular embodiment, which follows, when taken in conjunction with the accompanying drawing wherein:

FIG. 1 is a side [elevational] *elevation* view *in vertical section,* illustrating an embodiment of the invention; and FIG. 2 is an exploded isometric view of the device shown in FIG. 1, with [a] portion*s* thereof cut away.

Referring now to FIGS. 1 and 2, the vibratory system 10 of the device is shown comprised of a longitudinal*ly* vibratory [element for the] transmitting cone 11 which is driven by a magnetostrictive driver 12. The driver 12 may be a conventional type comprised of nickel laminations 13, and is energized by connecting the terminals 14 and 15 of a winding 16 attached thereto to *a source (not shown) of* a suitable direct current and alternating current of the proper frequency [(not shown)]. The driver 12 operates at its [natural resonate] *resonant* frequency and sets the vibratory element 11 into vibration. Said driver may have a length substantially equal to one-half wavelength of the oscillations of the operating frequency, while the vibratory element may be any integral number of half wavelengths long and is intended herein to be substantially one-half wavelength *at the operating frequency.* An antinode exists in this vibratory system at the region 17 where the driver is soldered, by any suitable means such as silver solder, to the vibratory element, and an antinode exists at the region 18. A node exists in this *longitudinally* vibratory system in the region 19 of the vibratory element.

A comparatively thin cylindrical sleeve 20, having a length which is substantially equal to one-quarter *of the wavelength of propagation of radial vibrations along the length of the sleeve,* [*wavelength*] or *an* odd integral [multiples] *multiple* thereof [of the operation frequency of the device], may also be silver soldered to the vibratory element in the region 19 of the node. Lengths other than a one-quarter wavelength or odd *integral* multiple [integral wavelength] may be used in systems wherein the amplitude of radial vibrations at the longitudinal node is substantially negligible, for reasons to be given in a subsequent paragraph. *It will be understood that an elongate element which is subjected to longitudinal vibration will also, to a degree determined by the Poisson ratio for the material employed, exhibit radial vibration. Such radial vibration is propagated along the sleeve at a velocity lower than that for longitudinal vibrations, and, as a result, radial vibrations at a given operating frequency are characterized by shorter wavelength than longitudinal vibrations at such frequency.*

A large massive ring 21 is connected to the other end of the sleeve, which mass may also be attached by means of silver solder. Openings 22[, 23] and 24 in the ring are provided for attaching a housing 25 to the ring, and an opening 26 is provided for attaching the terminals 14 and 15 to the proper supply sources. An inlet 27 is provided in the [top of the] housing 25 for supplying a coolant fluid to the tube 28, which is attached to the interior portion of the housing, as shown best in FIG. 2. Openings in the tube allow the coolant to flow over the vibratory system to remove heat as the coolant leaves *the* housing via an outlet 29 in [said] ring *21*. Openings 30, 31 and 32 in the base of the housing are provided to mate with *corresponding* [the] openings *such as* 22 [, 23 (not shown in the cutaway portion)] and 24 *in ring 21, the latter being* [and to be] secured by suitable watertight hardware 24a and a gasket (not shown) [when] *to* the housing [is secured to the ring]. The terminals of the winding extend through a watertight cap 33 secured to a pipe 34, in turn secured in the opening 26 of the ring. The watertight cap and pipe prevent the coolant from leaking out through the opening.

When the vibratory system is set into vibration, the region 19, a *longitudinal* node, is substantially free of longitudinal vibrations. Therefore, the end of the sleeve *20* and the structure attached thereto are similarly free of longitudinal vibrations. However, the end of attachment of the sleeve to the vibratory element is subjected to radial vibrations occurring at the node.

Radial vibrations occurring at [the] *this longitudinal* node induce a radial wave front that travels the length of the sleeve 20. Said wave front strikes the large mass of the ring 21, is reversed in phase, and is reflected back to the point of origination. The larger mass of the ring in comparison to that of the sleeve can be likened to an infinite stiffness for reflecting the wave front impinging thereon. Thus, during a first cycle when maximum radial displacement occurs at the longitudinal node, the amplitude of the radial wave front is at a maximum, and the sleeve at the region 19 is correspondingly displaced to a maximum, while the end of the sleeve terminated at the ring *21* is displaced to a minimum. The sleeve can be visualized as "bulging" during this portion of the cycle with the largest displacement in the vicinity of the region 19. However, because the length of the sleeve is substantially one-quarter *of the wavelength of propagation of radial vibrations along the length of the sleeve,* [wavelength,] reflected waves arrive back at the region 19 at a maximum amplitude, [but are] 180 degrees out of phase with respect to the initial wave, but [are] in phase with the next *half*-cycle of radial [vibrations] *vibration*, [which] characterized *by* minimum *radial* displacement at the lengitudinal node. Thus, the sleeve may *now* be visualized as being "contracted" at the region 19. It follows, then, that during successive cycles the dimensions of the sleeve change with the *radial* displacement occurring at the longitudinal node, and the existence of standing waves between the region 19 and the ring 21 prevents stresses at the junction between vibrator element and the sleeve, and substantially no energy passes from the ring to the rest of the system. Furthermore, *with respect solely to the prevention of perturbation of the longitudinal vibrations at region 19 (and ignoring problems of energy loss via sleeve 20)*, it is understood that the length of the sleeve can be selected to be other than *the aforementioned* [a] quarter wavelength (or odd integral multiple thereof) if the circumference of the vibrating element at the longitudinal node, and hence *of* the sleeve, is [a full wavelength] *equal to the wavelength of the longitudinal vibrations,* or an integral multiple thereof. Under these circumstances, the *radial* displacement of the sleeve will similarly correspond to the *radial* displacement *of cone 11* occurring at the longitudinal node, so that the length of the sleeve does not have to be one-quarter wavelength or odd integral multiple thereof *in order merely to prevent perturbation of longitudinal vibrations in cone 11.*

An additional advantage of a rigid sleeve is [exemplified] *realized in the performance of* [by performing] work on a body in a plane other than that normal to the tool. [Whereas, in other vibrator devices,] *Where* rubber or [rubber-like] *other resilient* members have been used *in prior art devices to support the longitudinally-vibratory element,* [as the compliant member, the sleeve in the present invention,] work at other than normal planes with these *prior art* devices is often precluded by [unsatisfactory lateral movement] *the resultant displacement of the point or points of support from their intended position.*

The vibratory device may be mounted in any convenient manner and may be attached to a drill press in the manner described in the aforementioned patent to Calosi. The tapered end of the vibratory element may be threaded to accept, preferably, a tool or a toolholder to which a work tool is attached.

It is realized that various other modifications of the invention may be made without departing from the [principals] *principles* of the invention. It is, therefore, intended that the claims which follow shall not be limited to the details of the embodiment herein described and illustrated.

What is claimed is:

1. In combination, an [elongated] *elongate* mechanical vibrator and means attached to one end thereof to set said vibrator into longitudinal oscillation, said vibrator having a length [equal] substantially *equal* to one or more integral half wavelengths of the *longitudinal* vibrations therein and having antinodes at its ends, and support means for said vibrator comprising [,] a substantially rigidly cylinder *one end of which is* attached to said vibrator in the vicinity of a node of the [natural resonant frequency] *longitudinal vibration* of said vibrator, said support means being of a length [equal] substantially *equal* to an odd integral number of [quarter wavelengths of said natural resonant frequency] *quarters of the wavelength of propagation of radial vibration along the length of the cylinder.*

2. In combination, an [elongated] *elongate* mechanical vibrator and means attached to one end thereof to set said vibrator into longitudinal oscillation, said vibrator having a length [equal] substantially *equal* to one or more integral half wavelengths of the *longitudinal* vibrations therein and having antinodes at its ends, [and] support means for said vibrator comprising [,] a substantially rigid cylinder *coaxially enveloping said vibrator and* having an internal diameter [smaller than] *equal to* the cross-section*al diameter* of said vibrator in the vicinity of a *longitudinal* node of said vibrator and a length [equal] substantially *equal* to an odd *integral* number of *quarters of the wavelength of propagation of radial vibration along the length of the cylinder,* [quarter wavelengths therein of said vibrations telescopically enveloping said vibrator], *one end of said cylinder being connected to said vibrator* substantially at said *longitudinal* node point, [at one end thereof] and a large mass attached to the other end of said cylinder.

3. In combination, an [elongated] *elongate* mechanical vibrator and means attached to one end thereof to set said vibrator into longitudinal oscillation, said vibrator having a length substantially equal to one or more integral half wavelengths of the *longitudinal* oscillations therein and *having* antinodes at its ends, and support means for said vibrator comprising [,] a cylinder having low sonic dissipation and having an internal diameter [smaller than] *equal to* the cross-sectional diameter of said vibrator in the vicinity of a *longitudinal* node of said vibrator and a length substantially equal to an odd *integral* number of [quarter wavelengths therein of said vibrations telescopically enveloping said vibrator] *quarters of the wavelength of propagation of radial vibration along the length of the cylinder, said cylinder coaxially enveloping said vibrator and having one end thereof connected to said vibrator* in the vicinity of said *longitudinal* node, [at one end thereof,] and a large mass attached to the other end of said cylinder.

4. In combination, a mechanical vibratory system comprising [a vibration source,] a tapered impedance transmission element *and a vibration source* coupled [to said source] *thereto to produce longitudinal vibrations therein*, support means *having a length* substantially *equal to* an odd integral number of [quarter wavelengths of said vibration source] *quarters of the wavelength of propagation of radial vibration along the length of said support means and* attached at one end thereof to said tapered element, [and] *said support means being* responsive to radial vibrations in said tapered element at the region of attachment, a large mass terminating said support means for reflecting *radial* [flexural] waves *propagated* [occurring] *along* [in] said support, *and* housing means including cooling means attached to said mass and enveloping a portion of said vibratory system, whereby the response of said support means and said mass to said transverse wave maintains said support means substantially rigid.

5. In combination, a mechanical vibratory system comprising a vibration source *coupled to* [and] a tapered impedance transmission element *to impart longitudinal vibrations thereto,* [coupled to said source, having a substantially resonant operating frequency,] substantially rigid *tubular* support means attached at one end thereof to said system substantially at a node *of the longitudinal vibration* of said system for supporting said system, said support means having an internal diameter substantially *equal to* [larger than] the outer diameter of said vibrator in the vicinity of [a] *said* node and having a length substantially an odd integral number of quarters *of the wavelength of propagation of radial vibration along the length of said support means,* [wavelength of said vibration source,] a large mass attached to the other end *of said support means* [thereof], and housing means including cooling means for said vibration source attached to said mass and enveloping said vibratory system, whereby the response of said support means and said mass to transverse waves occurring *in the former* [therein] at said node maintains said support means substantially rigid.

6. In combination, an [elongated] *elongate* mechanical vibratory system, and *tubular* support means for supporting said system enveloping a portion of said system and attached *at one end* to said system substantially at a node of the [natural resonant frequency] *longitudinal vibrations* of said system, said support *means* having a *transverse* circumference substantially equal to a wavelength *of the longitudinal vibration,* or *an* integral multiple thereof [of said natural resonant frequency].

7. In combination, an [elongated] *elongate* mechanical vibratory system, and *tubular* support means for supporting said system enveloping a portion of said system and attached *at one end* to said system substantially at a node of the [natural resonant frequency] *longitudinal vibrations* of said system, said support *means* having *any practical length and* a circumference substantially equal to a wavelength *of the longitudinal vibrations,* or *an* integral multiple thereof [of said natural resonant frequency and any practical length].

8. In combination an [elongated] *elongate* mechanical vibrator and means attached to one end thereof to set said vibrator into longitudinal oscillation, said vibrator having a length *substantially* equal [substantially] to one or more integral half wavelengths of the *longitudinal* vibrations therein and having antinodes at its ends, *and* a substantially rigid cylinder attached to said vibrator in the vicinity of a node of [the natural resonant frequency] *such longitudinal vibrations* of said vibrator, said support means having a *transverse* circumference [equal] substantially *equal* to a wavelength of *the longitudinal vibration* [said natural resonant frequency].

9. In combination, an [elongated] *elongate* mechanical vibrator and means attached to one end thereof to set said vibrator into longitudinal oscillation, said vibrator having a length *substantially* equal [substantially] to one or more integral half wavelengths of the *longitudinal* vibrations therein and having antinodes at its ends, a substantially rigid cylinder having an internal diameter *substantially equal to* [smaller than] the cross-sectional *diameter* of said vibrator in the vicinity of a node *of the longitudinal vibrations* of said vibrator and a circumference [equal] substantially *equal* to a wavelength *of the longitudinal vibration,* [therein of said vibrations telescopically] *said cylinder coaxially* enveloping said vibrator *and having one end connected to said vibrator* substantially at *a* [such] node *of the longitudinal vibrations therein* [point at one end thereof], and a large mass attached to the other end of said cylinder.

10. In combination, an [elongated] *elongate* mechanical vibrator and means attached to one end thereof to set said vibrator into longitudinal oscillation, said vibrator having a length substantially equal to one or more integral half wavelengths of the *longitudinal* oscillations therein and *having* antinodes at its ends, a cylinder having low sonic dissipation and having a circumference substantially equal to a wavelength of *the longitudinal vibration* [said vibrations therein] *thereof, said cylinder* telescopically enveloping said vibrator *and having one end thereof connected to said vibrator* in the vicinity of *a longitudinal node in the latter* [said node at one end thereof], and a large mass attached to the other end of said cylinder.

11. In combination, a mechanical vibratory system including an [elongated] *elongate* vibratory element and driving means attached to one end thereof *to impart longitudinal vibrations thereto,* cylindrical support means having a *transverse* circumference substantially equal to a wavelength *of the longitudinal vibration and* attached at one end [thereof] to said *vibratory* element substantially at a node of the *longitudinal* vibrations [induced therein] *in the latter,* a ring of large mass surrounding and displaced from said *vibratory* element *and* attached to [another] *the other* end of said support means, housing means including [a top] *end* and side wall means attached to said ring and forming with said support means an enclosure enveloping said driving means, *and* means inside said housing means for cooling said vibratory system.

References Cited in the file of this patent or the original patent

UNITED STATES PATENTS

| | | |
|---|---|---|
| 2,632,858 | Calosi | Mar. 24, 1953 |
| 2,651,148 | Carwile | Sept. 8, 1953 |